US011199987B1

(12) United States Patent
Prateek et al.

(10) Patent No.: US 11,199,987 B1
(45) Date of Patent: Dec. 14, 2021

(54) VECTORED DATA STORE FOR SEEDING AND BUILDING DATA STORES IN NEW REGIONS

(71) Applicant: Amazon Technologies, Inc., Seattle, WA (US)

(72) Inventors: Anuj Prateek, Edmonds, WA (US); Juan-Pierre Longmore, Seattle, WA (US); Eric Wei, Seattle, WA (US); Andrew J. Lusk, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/806,214

(22) Filed: Mar. 2, 2020

(51) Int. Cl.
G06F 13/00 (2006.01)
G06F 3/06 (2006.01)
H04L 29/08 (2006.01)
G06F 9/54 (2006.01)

(52) U.S. Cl.
CPC .......... *G06F 3/0647* (2013.01); *G06F 3/0604* (2013.01); *G06F 3/067* (2013.01); *G06F 9/54* (2013.01); *H04L 67/1097* (2013.01)

(58) Field of Classification Search
CPC ........ G06F 3/0647; G06F 9/54; G06F 3/0604; H04L 67/1097; H04L 3/067
See application file for complete search history.

(56) References Cited

U.S. PATENT DOCUMENTS

| 8,606,922 | B1 * | 12/2013 | Greenfield | H04L 41/22 709/226 |
| 9,923,865 | B1 * | 3/2018 | Wei | H04L 61/2514 |
| 10,067,785 | B1 * | 9/2018 | Wei | G06F 9/45558 |
| 10,691,653 | B1 * | 6/2020 | Aiken | G06F 21/6218 |
| 10,922,132 | B1 * | 2/2021 | Shiramshetti | H04L 9/0819 |
| 2015/0331635 | A1 * | 11/2015 | Ben-Shaul | G06F 3/061 711/120 |
| 2017/0366606 | A1 * | 12/2017 | Ben-Shaul | G06F 3/064 |
| 2020/0409797 | A1 * | 12/2020 | Mathew | G06F 3/0664 |

* cited by examiner

*Primary Examiner* — Jing-Yih Shyu
(74) *Attorney, Agent, or Firm* — Thomas | Horstemeyer, LLP

(57) ABSTRACT

Launching data stores when new computing infrastructure is deployed is described. A proxy data storage service may be provided that receives instances of an application programming interface (API) call to store data and determines one of a first data store or a second data store to store the data. For instance, in response to receipt of a first instance of the API call, the proxy data storage service may store data in a first data store. However, after a provisioning of the second data store, the proxy data storage service may store data in the second data store in response to receipt of a second instance of the API call. In an instance in which the data stored in the second data store also exists in the first data store, the data is deleted from the first data store until an eventual migration of data is achieved.

20 Claims, 9 Drawing Sheets

VECTORED DATA STORE FOR SEEDING AND BUILDING DATA STORES IN NEW REGIONS

BACKGROUND

Enterprises and other organizations offer network services that are utilized by various computing applications when performing enterprise-related tasks. These network services may include data storage, video streaming, machine learning, "serverless" computing, and other network services offered using physical and virtual computing resources of one or more data centers. New data centers and other enterprise-related infrastructure, such as fulfillment centers or regional computing centers, are often opened or brought online to account for increasing consumer demand in various geographical regions. However, when a new data center or other facility is opened, various network and computing services must be provided to integrate the data center, fulfillment center, or other facility in existing network and computing infrastructure.

Traditionally, when a new facility or other computing infrastructure is brought online, a temporary database is provided to allow developers or other individuals to store data in a data store. The data in the data store is eventually migrated to a live data store through manual migration. The manual migration of data has many risks, including data loss and potential conflicts between data residing in a live data store with data stored in the temporary data store. Also, downtime is imposed during which services are not able to store data.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
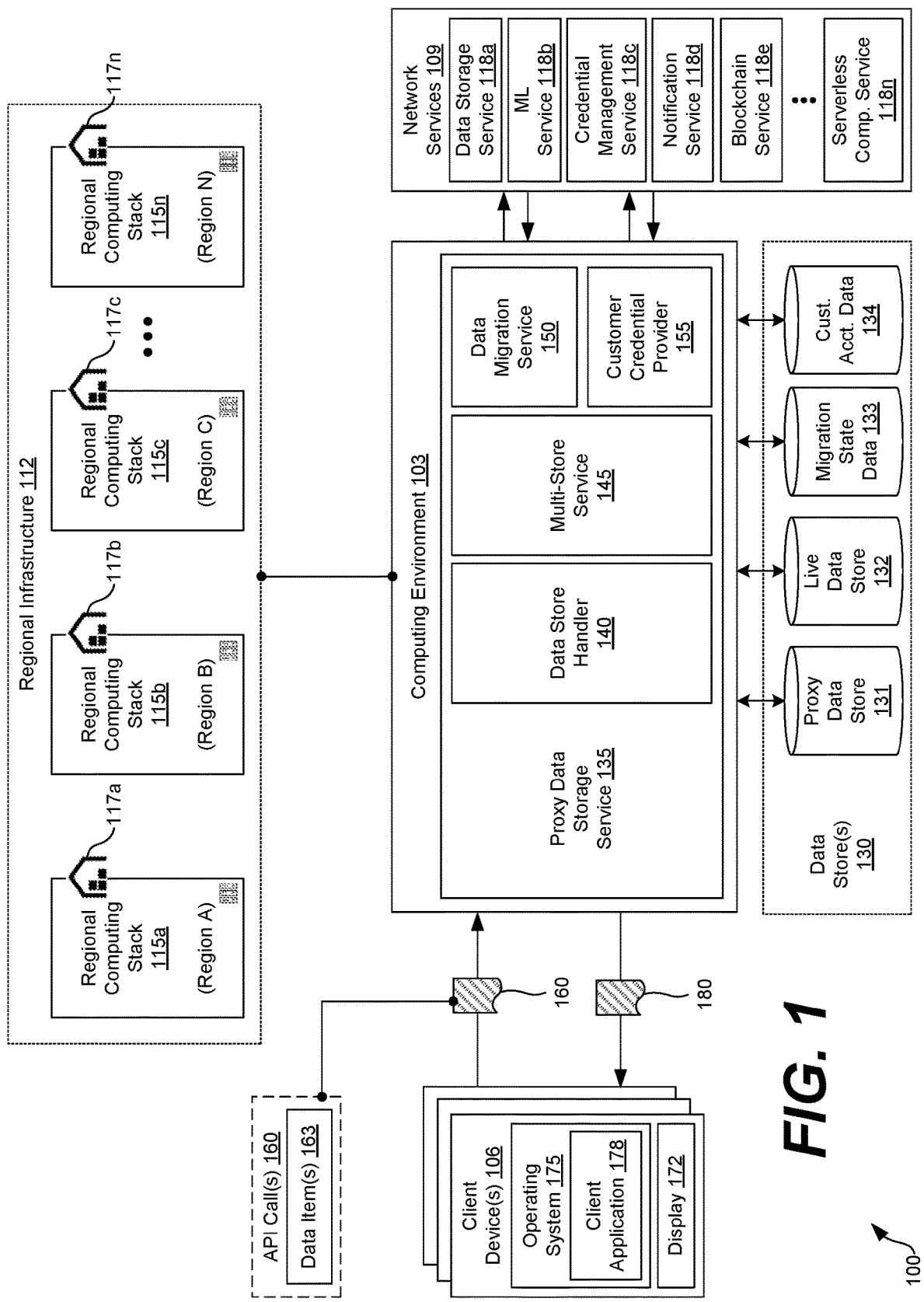
FIG. 1 is a drawing of a networked environment according to various embodiments of the present disclosure.

The present disclosure relates to vectored data stores for seeding and building data stores for new regions and new regional computing stacks. Various development teams in an enterprise may rely on a database service, such as an SQL or "no-SQL" database service, to store data. The data may be required to provide network services, store data in association with customer or other user accounts, maintain user credentials, and so forth. However, when a new facility comes online or a regional computing stack is deployed, referred to herein as a "region build," establishing or otherwise providing a data store for developers to utilize is not an instantaneous task. Accordingly, databases and associated services are often not available during early stages of a region build. This provides a bottleneck for development teams.

As such, administrators may provide a development team with a proxy data store to use in the interim while a live data store, to be utilized more permanently, is provisioned and configured. The proxy data store may include a data store having no reliance on the real data store. However, when administrators complete provisioning and the configuration of a live data store for a new region build, the administrators must seed the live data store with data previously stored in the proxy data store. Moving data between the proxy data store and the live data store can involve bringing down the proxy data store and impacting new region builds by imposing outages that can last multiple days.

For example, assume a database or other data store is brought live at time $t_0$ whereas the new region build must go live at $t_{ga}$. Database administrators are required to move data from the proxy data store to a live data store in time $t=t_{ga}-t_0$. Current best practices for the migration of a database require transferring portions of the proxy data store to the live data store in a fraction of t to avoid database and service outages. On the other hand, development teams have to survive outages and track migration status before the development teams are able to begin using a live data store, otherwise risking a "split-brain" or, in other words, data residing in different data stores.

Accordingly, embodiments are described herein for a vectored data store model for a proxy data store to achieve zero outages during data migration and utilization of complete t for migrations. According to various embodiments, a proxy data store (also referred to as a "stub data store") is used to store data into tables maintained by a database administrator. The proxy data store may include a development data store to be used temporarily, as may be appreciated. After a database is scheduled to transition to a live data store or, in other words, a non-developmental data store, use of the proxy database is maintained until all data has been migrated from the proxy data store to the live data store. All of the data that is stored in database tables after the live database is made active is referred to as "overhead" in terms of data migration.

A vectored proxy database layer may be provided as a unifying layer on top of the proxy data store and the live data store. The vectored proxy database layer may provide a consistent view of two data stores, e.g., the proxy data store and the live data store, while ensuring new data is only written to the live data store. This limits the amount of data required to be migrated and frees administrators from having to perform rushed migrations on short timelines.

According to various embodiments, a computing environment may include one or more computing devices that are configured to, in response to one or more instances of a programming interface (API) call, store data in a first data store. After starting a migration of use from the first data store to the second data store, the multi-store service may store data in one of the first data store or the second data store in response to a second plurality of instances of the API call. The data may be stored in the first data store or the second data store based at least in part on migration state data, for example. In response to the migration of use of the first data store to the second data store being complete, the multi-store service may store data in the second data store.

In the following discussion, a general description of the system and its components is provided, followed by a discussion of the operation of the same.

With reference to FIG. 1, shown is a networked environment 100 according to various embodiments. The networked environment 100 includes a computing environment 103, a client device 106, and various network services 109, which are in data communication with each other via a network. The network includes, for example, the Internet, intranets, extranets, wide area networks (WANs), local area networks (LANs), wired networks, wireless networks, or other suitable networks, etc., or any combination of two or more such networks. Such networks may include satellite networks, cable networks, Ethernet networks, and other types of networks.

The computing environment 103 may include, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

In instances in which computing devices of the computing environment 103 are distributed in different geographical regions or locations, the computing devices may make up regional infrastructure 112. For instance, one or more computing devices or other computing infrastructure may form one or more regional computing stacks 115a . . . 115n (collectively "regional computing stacks 115"). Each of the regional computing stacks 115 may serve a region, such as a country or portion of a country, to account for demand of computing services, provide consumers with various goods, etc. As such, the regional computing stacks 115 may include those physically located in a facility 117a . . . 117n (collectively "facilities 117"), where the facility 117 may include a data center, fulfillment center, or other installation as may be appreciated.

In one example, a first regional computing stack 115a may provide electronic commerce-related web services that serve consumers in Australia, whereas a second regional computing stack 115b provides database storage web services for the Western portion of the United States. In another example, even though the regional computing stacks 115 are distributed geographically, they may work in conjunction to provide a web service accessible from any region. As may be appreciated, each regional computing stack 115 may include physical computing infrastructure, such as servers, memory devices, switches, routers, and other computing and network equipment. Additionally, each regional computing stack 115 may operate software and virtual resources on the physical infrastructure to provide various computing services, as will be described.

The network services 109 may include web services in some examples that can be invoked using a network service call or an API call made to an API. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The network services 109 may be independent of the computing environment 103 in some examples, and may be operated by a third-party. Alternatively, the network services 109 may be a portion of the computing environment 103, and may be maintained and/or operated by a common entity. In some embodiments, the regional computing stacks 115 include regional infrastructure 112 for serving up the network services 109.

The regional infrastructure 112 may be formed as a number of regions, where a region is a geographical area in which a computing provider clusters data centers or other infrastructure. Each region can include two or more availability zones connected to one another via a private high speed network such as, for example, a fiber communication connection. An availability zone (also termed availability domains, or simply zones, in various embodiments) refers to an isolated failure domain including one or more data center facilities with separate power, separate networking, and separate cooling from those in another availability zone.

Preferably, availability zones within a region are positioned far enough away from one other that the same natural disaster should not take more than one availability zone offline at the same time. Customers may connect to availability zones of the computing provider network via a publicly accessible network (e.g., the Internet or a cellular communication network). Transit Centers (TC) are the primary backbone locations linking customers to the cloud provider network, and may be co-located at other network provider facilities (e.g., Internet service providers or telecommunications providers). Each region can operate two TCs for redundancy.

Even further, in accordance with various embodiments, the network services 109 may include an elastic compute cloud service (also referred to as an elastic compute service, virtual machines service, computing cloud service, compute engine, or cloud compute service, in various implementations), a data storage service 118a, a machine learning (ML) service 118b, a credential management service 118c, a notification service 118d, a blockchain service 118e, a serverless computing service 118n (also referred to as a function compute service, functions service, cloud functions service, or functions as a service, in various implementations), video streaming services, as well as other types of network services 109 as can be appreciated. The data storage service 118a may be an elastic block store service (also referred to as a cloud disks service, managed disk service, storage area network service, persistent disk service, or block volumes, in various implementations) that supports customer volumes.

Various applications and other functionality may be executed in the computing environment 103 according to various embodiments. Also, various data is stored in a data store 130 that is accessible to the computing environment 103. The data store 130 may be representative of a plurality of data stores 130 as can be appreciated. The data stored in the data store 130, for example, is associated with the operation of the various applications and/or functional entities described below.

The components executed on the computing environment 103, for example, include a proxy data storage service 135, and other applications, services, processes, systems, engines, or functionality not discussed in detail herein. In various embodiments, the proxy data storage service 135 is executed to store data in or retrieve data from one or more of the data stores 130, for instance, in response to API calls received from client devices 106 or network services 109.

Development teams in an enterprise or other organization may rely on one or more of the data stores 130 to store and retrieve data. The data may be required to provide network services 109, store data in association with customer or other user accounts, maintain user credentials, and so forth. However, when a new region build occurs, establishing or otherwise providing a data store 130 for developers to utilize is not an instantaneous task. As such, data stores 130 and associated services are often not available during early stages of a region build.

To facilitate region builds, the proxy data storage service 135 may provide instant or near-instant access to a proxy data store 131 that may be utilized by developers working on a region build while a live data store 132 is being provisioned, configured, or otherwise serviced. As such, it is understood that the proxy data store 131 may be a development environment to be used temporarily and the live data store 132 may be a more permanent-type data store. To this end, the proxy data store 131 is not utilized by extraneous services outside of an entity or other organization. For instance, the proxy data storage service 135 may not serve up data from the proxy data store 131 to network services 109, client devices 106, or other requesting entities. Instead, the proxy data store 131 may only serve up data to administrators during deployment of a new region build. Alternatively, the proxy data storage service 135 may not serve up data from the proxy data store 131 to customers, whereas the proxy data storage service 135 may provide data from the live data store 132 to customers or other requesting entities.

Further, the proxy data storage service 135 may respond to API calls based on a state of migration of use from the proxy data store 131 to the live data store 132. For instance, when the live data store 132 is fully provisioned, it is understood that the live data store 132 is to be utilized to provide data to customers, network services 109, or other requesting entities. However, manual migration of data from the proxy data store 131 to the live data store 132 is not ideal. Additionally, changing program code is not ideal as developers would be required to re-write code such that API calls that invoke the proxy data store 131 are modified to instead invoke the live data store 132.

To this end, the proxy data storage service 135 may automatically determine whether to store data in the proxy data store 131 or the live data store 132 based on a state of migration of use. By way of example, assume a developer writes code that includes an API call 160 of "putItem (data_object_1)," which is invoked to store a data item 163, "data_object_1," in the data store 130. The proxy data storage service 135 may determine whether to store the data item 163 in the proxy data store 131 or the live data store 132 based on a state of migration of the proxy data store 131 to the live data store 132, as will be described.

As such, when the live data store 132 is being provisioned, the proxy data storage service 135 may store data items 163 in the proxy data store 131 in response to the "putItem( )" API call 160. However, when the live data store 132 is fully provisioned, the proxy data storage service 135 may store data objects in the live data store 132 in response to the "putItem( )" API call 160, which is the same as the previous API call 160. As such, developers are not required to rewrite code to account for the migration of the proxy data store 131 to the live data store 132.

Also, developers are unaware that data items 163 are being stored in different data stores 130. For instance, a retrieval of a data item 163 from the data store 130 is handled by the proxy data storage service 135 such that developers are unaware that their data items 163 were stored in the proxy data store 131 or the live data store 132. In other words, it always appears that the data items 163 are stored in a live environment. However, the proxy data storage service 135 may handle a migration of data from the proxy data store 131 to the live data store 132 over time such that the entries in the proxy data store 131 eventually transition to zero entries.

In various embodiments, the proxy data storage service 135 may include a data store handler 140, a multi-store service 145, a data migration service 150, a customer credential provider 155, as well as other services, engines, modules, applications, or other computer-implemented components. The data store handler 140 is executed to handle API calls received at the computing environment 103. The data store handler 140 may also authenticate API calls, aggregate various configurations, and query the multi-store service 145 to store or retrieve data, as will be described. In further examples, the data store handler 140 may generate API executables, also referred to as queries, that are sent to the multi-store service.

In some examples, before the live data store 132 is provisioned, configured, or made available for permanent use, the data store handler 140 may create a single executable that is mapped to the proxy data store 131. In some embodiments, the proxy data store 131 is in a first regional computing stack 115a (e.g., a production region) and the live data store 132 is in a second regional computing stack 115b (e.g., a live region), which are different regional computing stacks 115. After the live data store 132 is provisioned and made available for permanent use, the data store handler 140 may read migration state data 133 (along with customer assume role credentials), and may construct multiple API executables. A result of execution of the executables, results may be aggregated by the multi-store service 145 and returned to data store handler 140.

The multi-store service 145 may execute API executables, or queries, generated by the data store handler 140. In some embodiments, based on a type of executable, the multi-store service 145 may query the proxy data store 131 or the live data store 132. Then, the multi-store service 145 may aggregate API call results, or an exception, into a single response that is returned to the data store handler 140.

The data migration service 150 is executed to migrate data residing in the proxy data store 131 to the live data store 132. Also, the data migration service 150 may provide or adjust a state of migration of use from the proxy data store 131 to the live data store 132 using, for example, migration state data 133. For instance, an administrative team may determine whether the live data store 132 has been fully provisioned or is otherwise ready to be utilized. In another example, a developer may be notified that the live data store 132 has been fully provisioned and the developer may make the determination whether the live data store 132 is to be made active or otherwise made "live," such that the live data store 132 is used to provide data in response to API calls.

Beyond the proxy data store 131 and the live data store 132, the data stored in the data store 130 includes, for example, migration state data 133, customer account data 134, and potentially other data. The migration state data 133 may include information associated with a state of provisioning of the live data store 132. In some embodiments, the migration state data 133 include a configurable flag that identifies whether the live data store 132 is active or not. It is understood that when the live data store 132 is made active, the live data store 132 is used to retrieve data, which may be provided to customers, network services 109, or other requesting entities, as opposed to the proxy data store 131. The customer account data 134 may include information associated with various customer accounts, such as customer account credentials, customer account data allowances, as well as other customer account data.

The proxy data store 131 may include a first type of data store, such as an SQL data store while the live data store 132 may include a second type of data store, such as a no-SQL data store. Alternatively, the proxy data store 131 and the live data store 132 may include the same or similar types of data stores. In some embodiments, the proxy data store 131 and/or the live data store 132 are DynamoDB® data stores. Results of API calls 160 and other queries may be returned as data vectors, or arrays of data, as may be appreciated.

The client device 106 is representative of a plurality of client devices that may be coupled to the network. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 172. The display 172 may include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a client application 178 and/or other applications. The client application 178 may be executed in a client device 106, for example, to access network content served up by the computing environment 103 and/or other servers, thereby rendering a user interface on the display 172. To this end, the client application 178 may comprise, for example, a browser, a dedicated application, etc., and the user interface may include a network page, an application screen, etc. The client device 106 may be configured to execute applications beyond the client application 178 such as, for example, email applications, social networking applications, word processors, spreadsheets, and/or other applications.

Next, a general description of the operation of the various components of the networked environment 100 is provided. To begin, when a new region build occurs, the proxy data storage service 135 may provide a team of developers or other individuals with a proxy data store 131, which may include a data store 130 of a first regional computing stack 115a that is a temporary data store. The team of developers may begin to store data items 163 in the proxy data store 131 using an API call 160. While doing so, the proxy data storage service 135 may begin provisioning a live data store 132 in a second regional computing stack 115b, where the live data store 132 is a more permanent type of data store 130.

As the developers continue to use the API call 160 to store data items 163, the proxy data storage service 135 may determine whether to store the data items 163 in the proxy data store 131 or the live data store 132 based on a state of migration. For instance, while the live data store 132 is being provisioned or is otherwise inactive, the proxy data storage service 135 will respond to API calls 160 by storing data items 162 in the proxy data store 131 and returning a confirmation of storage 180 to the client device 106. However, after the live data store 132 has been fully provisioned or otherwise made active, the proxy data storage service 135 will respond to API calls 160 by storing data items 163 in the live data store 132. As such, developers are not required to change their programming code and the changes are performed automatically by the proxy data storage service 135. In other words, the same API call 160 will store data in one of the proxy data store 131 or the live data store 132 at different periods of time in the state of migration.

In further embodiments, the proxy data storage service 135 may determine whether to store the data items 163 in the proxy data store 131 or the live data store 132 based at least in part on other information, such as identifying information provided in a request to store data. Identifying information may include, for example, an internet protocol (IP) address, user account role credentials, an email address, a user account identifier, or other identifying information. For instance, if an IP address of a request is associated with that of a verified administrator, the data may be stored in the live data store 132 whereas if the request is not associated with a verified administrator, the data may be stored in the proxy data store 131. In another example, if a role associated with a customer account is a verified role, the data may be stored in the live data store 132 whereas if the role is not verified, the data may be stored in the proxy data store 131.

Although data items 163 are stored in the live data store 132 after the live data store 132 has been provisioned or otherwise made active, some data items 163 may still reside in the proxy data store 131. As such, the proxy data storage service 135 may oversee a gradual migration of data items 163 from the proxy data store 131 to the live data store 132, which occurs over time based on store and read events performed on one or more of the data stores 130. As the migration of data is not instantaneous, the proxy data storage service 135 may synchronize data items 163 between the proxy data store 131 and the live data store 132 without locking or bringing down the proxy data store 131 and the live data store 132.

Figure 2:
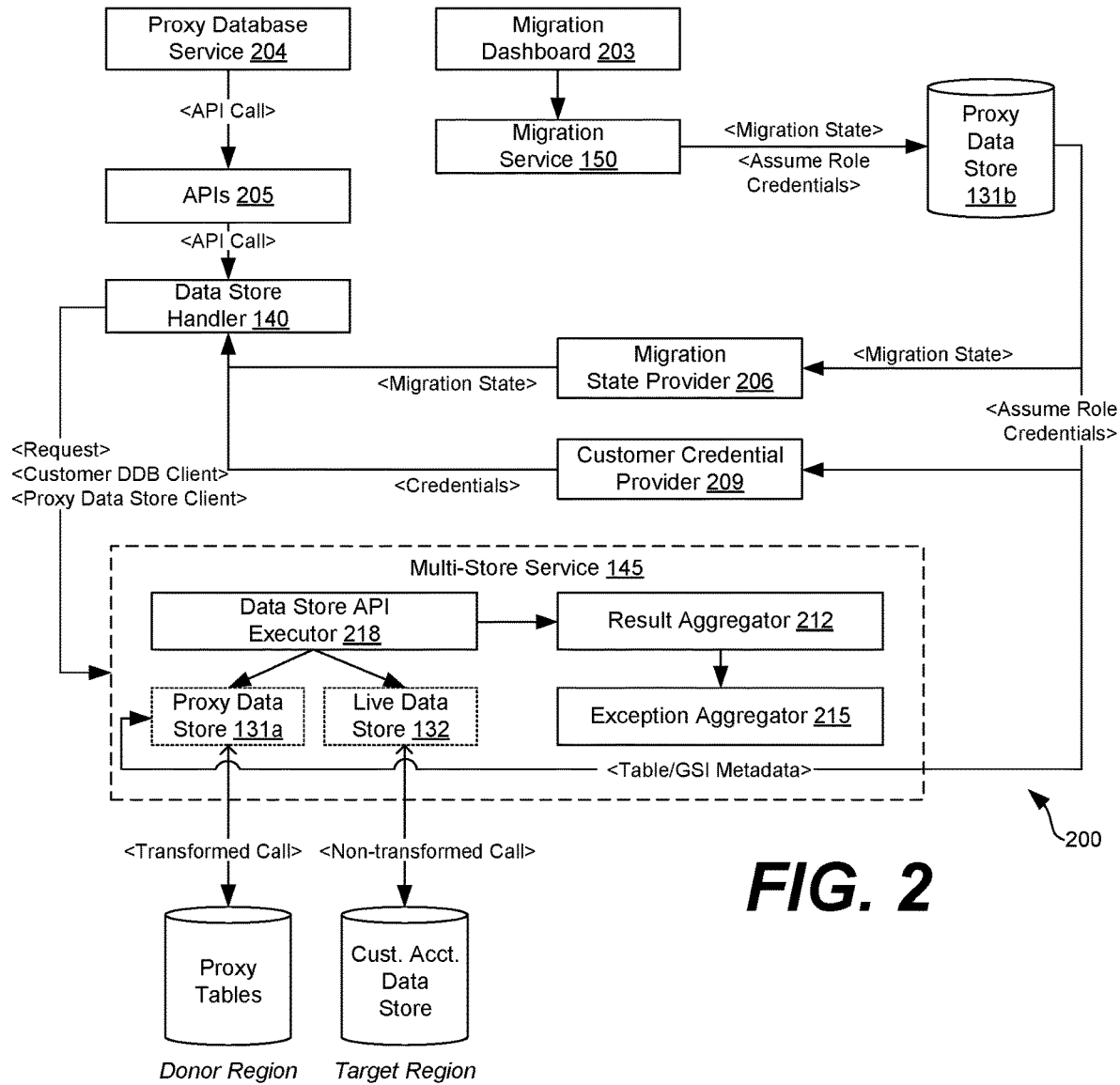
FIG. 2 is a schematic diagram of various components of the networked environment according to various embodiments of the present disclosure.

Turning now to FIG. 2, a schematic diagram 200 of various components of the networked environment 100 is shown according to various embodiments of the present disclosure. A developer, administrator, or other individual associated with provisioning of a live data store 132 may access a migration dashboard 203, which can include one or more user interfaces generated by a client application 178 on a client device 106. The migration dashboard 203 may be accessed to provide a status of migration of use from the proxy data store 131 to the live data store 132. Also, the migration dashboard 203 may be accessed to start the migration of use from the proxy data store 131 to the live data store 132, as will be described.

To provide an administrator with a state of the migration of use from the proxy data store 131 to the live data store 132, the networked environment 100 may further include a migration state provider 206 and a customer credential provider 209. The migration state provider 206 may access migration state data 133 and provide an administrator or the data store handler 140 with information associated with the state of the migration of use from a first data store (e.g., the proxy data store 131) to at least a second data store (e.g., the live data store 132). The customer credential provider 209 may provide customer credentials to the data store handler 140 or other service.

Generally, the data store handler 140 includes an API handler for a proxy data store 131. More specifically, the data store handler 140 may receive and respond to API calls, conforming to an application programming interface 205 (or "API 205") received at a proxy database service 204. The proxy database service 204 may include one that retrieves or intercepts API calls 160 to store and read data from one or more of the data stores 130.

Further, the data store handler 140 may authenticate requests or API calls 160, aggregate various configurations, and call the multi-store service 145. In some embodiments, the data store handler 140 may build API executables, or queries, that are then sent to the multi-store service 145. Before a live data store 132 is brought online or otherwise made active, the data store handler 140 may create an executable that is mapped to the proxy data store 131. After the live data store 132 is brought online, the data store handler 140 may read migration state data 133 (along with customer assume role credentials), and construct one or more executables (e.g., two executables). For instance, a result of executing two or more executables may be aggregated by the multi-store service 145 and returned to data store handler 140.

The multi-store service 145 may execute the API executables, such as those constructed by the data store handler 140. Based on a type of executable, the multi-store service 145 may query the proxy data store 131 or the live data store 132. The multi-store service 145 may aggregate API call results (or an exception) into a single response, which is then returned to the data store handler 140.

The multi-store service 145 may store data in the proxy data store 131 prior to the live data store 132 being made active. As such, the multi-store service 145 may use a donor region database and a development customer account to store data. The multi-store service 145 may transform API executable request parameters to avoid table conflicts, optimize provisioned read and write (R/W) capacity, and ultimately emulate a target region.

Further, the multi-store service 145 may store data in the live data store 132 in a target region, such as a region in association with a customer account. In some embodiments, the multi-store service 145 may execute an API executable without any transformations. Essentially, the multi-store service 145 may act as a proxy to the live data store 132. The effect of calling the proxy data store 131 is the same as calling the live data store 132 in a target region directly.

In various embodiments, the multi-store service 145 may further include a result aggregator 212, an exception aggregator 215, and a data store API executor 218. The result aggregator 212 may be executed to aggregate API responses from the proxy data store 131 and the live data store 132. After the live data store 132 is made active, the multi-store service 145 may receive two executables, for instance, in response to an API call received by the data store handler 140. A first executable, for example, is executed on the proxy data store 131 and a second executable is executed on the live data store 132. The result aggregator 212 may aggregate the results and return a single API response based on predetermined rules.

Similar to the result aggregator 212, the exception aggregator 215 may aggregate exceptions, where exceptions may include errors generated in response to an API call. An exception may be generated when a data item 163 is unable to be located in the proxy data store 131 or the live data store 132, or if an API call 160 is improperly configured. Like the result aggregator 212, the exception aggregator 215 may generate a result in accordance with predetermined exception rules. The exception aggregator 215 may be called by the result aggregator 212, in the event one or more exceptions are identified from one or both of the API executables. The data store API executor 218 may execute queries on the proxy data store 131 and/or the live data store 132.

Figure 3:
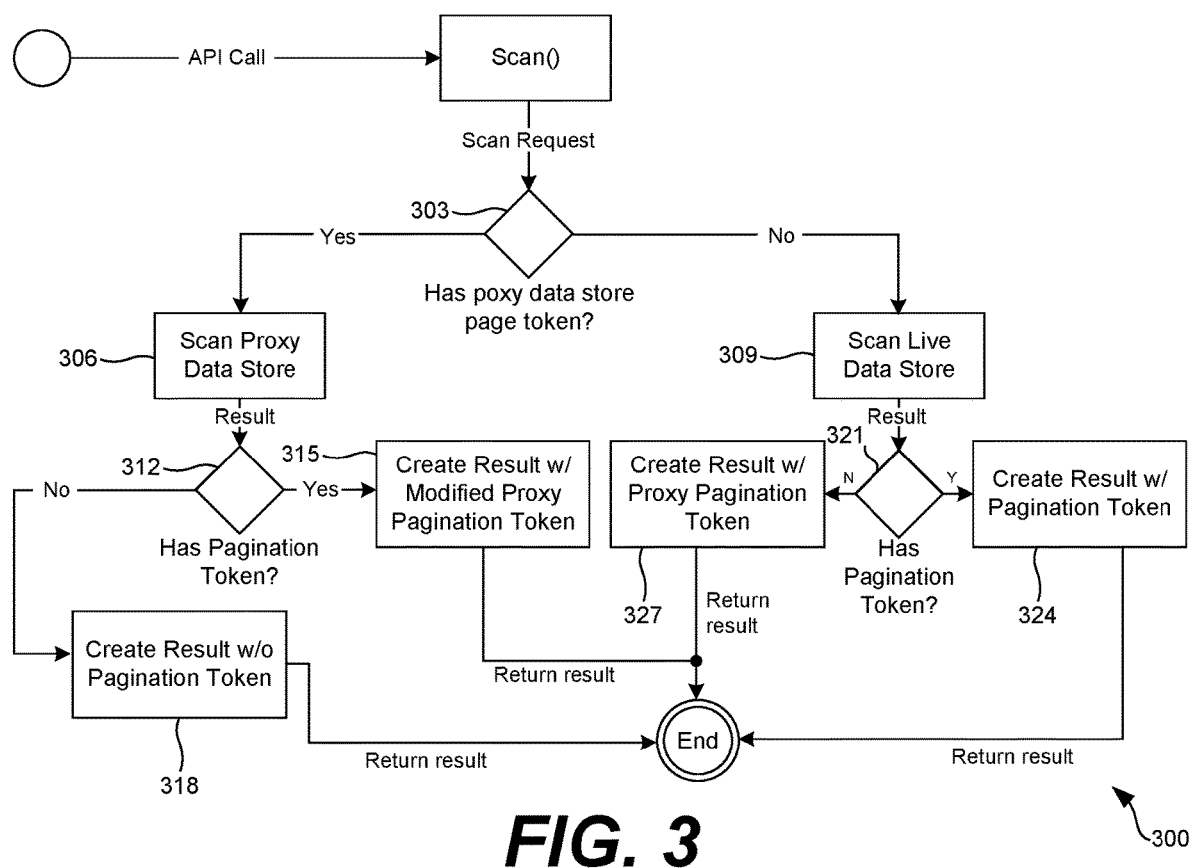
FIG. 3 is a flowchart illustrating one example of a scan operation executed in a computing environment in the networked environment of FIG. 1 according to various embodiments of the present disclosure.

Referring next to FIG. 3, a flowchart 300 is shown that illustrates an example of a scan routine, Scan( ), that searches the proxy data store 131 and/or the live data store 132 using, for example, a predefined string. In some embodiments, the scan routine may be called in response to a user of a client device 106 switching between pages of search results, referred to as pagination. For instance, after executing a query, a user may be shown with a first page of search results. The user may select a second page of search results, which again causes the scan routine to be executed. A pagination token may be used to identify the search results only for the second page, as opposed to re-performing a search that includes search results from the first page.

Initially, it is assumed that there is no duplicates of data items 163 between the proxy data store 131 and the live data store 132. As shown in FIG. 3, the scan routine is first performed on the live data store 132 and then performed on the proxy data store 131, unless the scan routine has been provided with a proxy data store page token specifying that a page of search results only relates to the proxy data store 131. If so, the proxy data store 131 is queried based on the proxy data store pagination token. After a scan routine has completed in the live data store 132, a dummy token may be returned. In subsequent calls, a modified pagination token may be returned, which indicates that the scan routine should be performed on the proxy data store 131 as opposed to the live data store 132.

It is understood that during migrations, a small period of time may occur where a data item 163 exists in both the proxy data store 131 and the live data store 132. As such, the scan routine may return duplicates. To address this issue, all results from the scan routine on the live data store 132 are identified and then filtered using results from the scan routine performed on the proxy data store 131.

In some embodiments, filtering results of the live data store 132 with the results of the proxy data store 131 is not possible due to memory constraints. As such, in various embodiments, a data store comprising duplicate data items 163 may be maintained. For instance, when data items 163 are stored using a PutItem( ) or similar routine, a modified version of the PutItem( ) routine is instead utilized that records possible duplicates.

Assume that a table, ST, is defined in the proxy data store 131 and a corresponding table, RT, is defined in the live data store 132. The proxy data storage service 135 may maintain a replica table, STR, that holds possible duplicates of data items 163 between the proxy data store 131 and the live data store 132. Now assume that a data item 163, SI, exists in the Table ST and the data item 163 must then be placed in Table RT as a data item 163, RI.

Both of the data items 163 may have a same primary key (PK), which includes an identifier that uniquely identifies the data item 163 and/or any corresponding information. In other words, the primary key of RI (e.g., PK(RI)) is equal to the primary key of SI (e.g., PK(SI)). To put the data item 163 RI in Table RT, the following may be performed. First, a possible duplicate is recorded in Table STR (e.g., STR.putItem(PK(RI))). Next, the data item 163 is stored in the live data store 132 (e.g., RT.putItem(RI)). Then, the data item 163 is deleted from the proxy data store 131 (e.g., ST.deleteItem(PK(RI))==ST.deleteItem(PK(SI))). Finally, the possible duplicate is deleted from Table STR (e.g., STR.deleteItem(PK(RI))). It is understood that these operations may be performed asynchronously. It is also understood that the PutItem( ) routine may fail at or after any of these operations, as shown below:

| Failure Point | Effect |
| --- | --- |
| While recording possible duplicate | No effect. A new data item 163 is not created as no data change has occurred. |
| After recording possible duplicate | False Positive. There is a no duplicate, but the possibility of a duplicate was recorded. Data item 163 SI remains the valid data item 163. |
| After storing new item in real DDB store | True Positive. There is a duplicate and the possibility is recorded. |
| After deleting the old item | False Positive. There is a no duplicate but we recorded the possibility. Data item 163 RI becomes the valid data item 163. |

If the proxy data storage service 135 fails to delete data items 163 from the potential duplicates table, the table will continue to grow. Eventually, Table STR will grow too big and defeat the purpose of its existence. As such, in some embodiments, a separate continuous process may be executed to prune the potential duplicate table periodically. Essentially, the process may select an data item 163 (STRI) from Table STR and determine if the data item 163 exists in Table RT. If the data item 163 exists in Table RT, then a deleteItem( ) routine may be executed to delete the data item 163 from Table STR (e.g., ST.deleteItem(PK(STRI)) and STR.deleteItem(PK(STRI))). As such, duplicates will eventually be removed and Table STR will converge to zero entries.

It should be noted that the aforementioned operations may be performed on tables owned by a same customer account (e.g., a development team account) and reside in a same regional computing stack 115. As such, it may be ensured that operations are performed in an atomic fashion, meaning false positives will not occur where data item 163 RI exists and data item 163 SI does not exist. With some routines, such as Get( ) and DeleteItem( ), the Table STR does not need to be consulted because of the existence of the data item 163 in Table RT, which may be used as tie breaker. The Table STR, however, may be used with Scan( ) operations to avoid duplicates.

At 303, the proxy data storage service 135 may determine whether a scan request includes a proxy data store page token. If so, the process may proceed to 306 to scan the proxy data store 131. Otherwise, the process may proceed to 309 to scan the live data store 132. Referring first to 306, after the proxy data store 131 has been scanned, another determination is made whether a result has a pagination token in 312. If so, the process may proceed to 315 to create a result with a modified proxy pagination token to be used in subsequent scan requests. The process thereafter may proceed to completion. Referring again to 312, if the result does not include a pagination token, the process may proceed to 318. In 318, the proxy data storage service 135 may generate a result without a pagination token. Thereafter, a result may be returned and the process may proceed to completion.

Referring back to 309, after the live data store 132 has been scanned, the process may proceed to 321. In 321, the proxy data storage service 135 may determine whether the result has a pagination token. If so, in 324, a result may be created and returned with the pagination token and, thereafter, the process may proceed to completion. Alternatively, if a pagination token is not present, the process may proceed to 327. In 327, the proxy data storage service 135 may generate a result with a proxy pagination token to be used in subsequent scans. Thereafter, a result may be returned and the process may proceed to completion.

Figure 4:
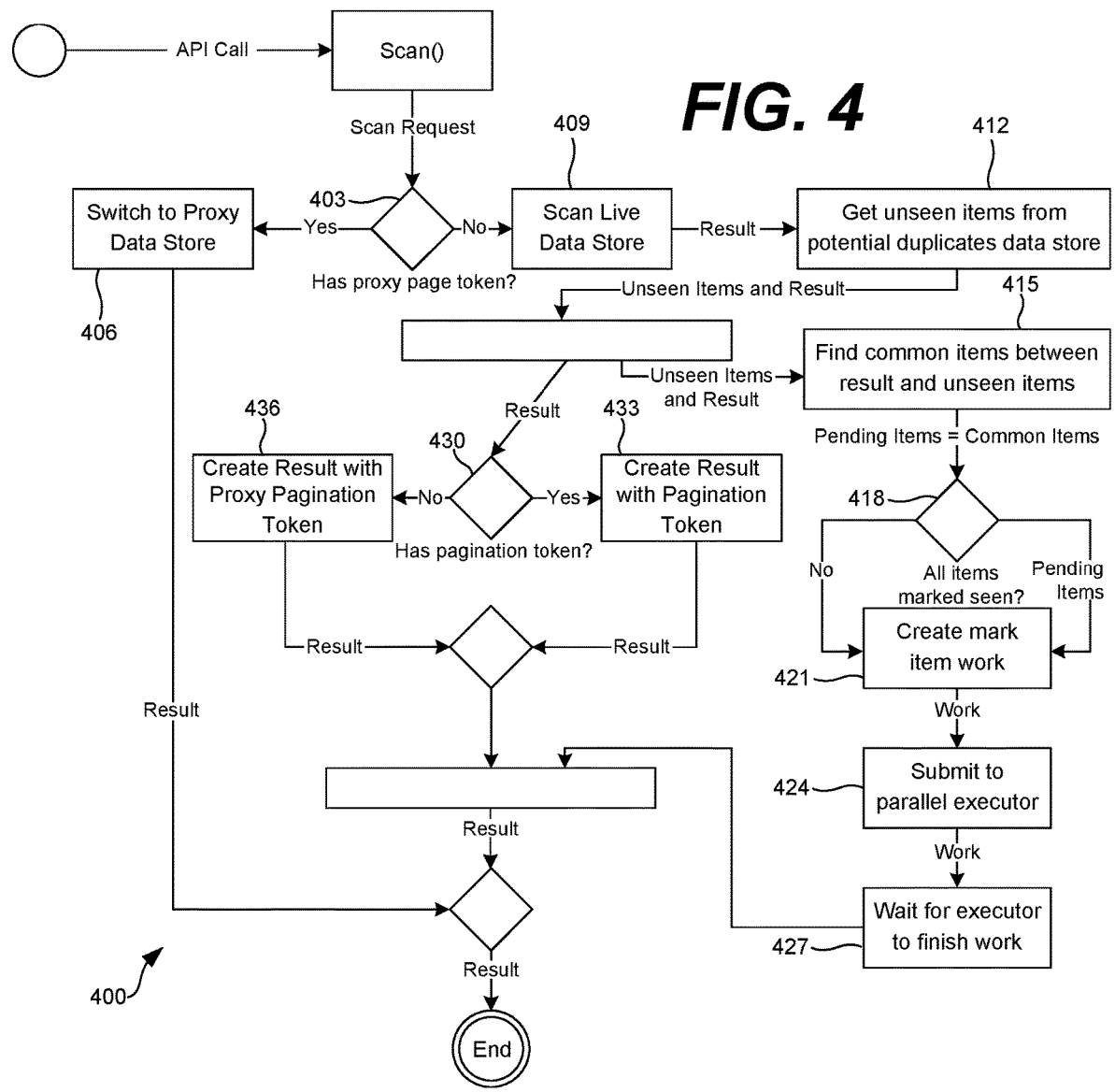
FIG. 4 is a flowchart illustrating another example of a scan operation executed in a computing environment in the networked environment of FIG. 1 according to various embodiments of the present disclosure.

Turning now to FIG. 4, a flowchart 400 is shown illustrating another example of a modified scan routine, Scan( ), according to various embodiments. Initially, it is assumed that the Table STR, comprising potential duplicates described above, will converge to zero. In the event a scan operation, Scan( ), is to be executed on the live data store 132, the following operations may be performed.

First, a page the live data store 132 may be scanned and resulting data items 163, RDI, may be returned. Unseen items from the Table STR are determined (e.g., Table USTRI). A batch update may be executed on data items 163 existing in both Table USTRI and data items 163 RDI, which may be marked as "seen." In some embodiments, these operations may be executed in parallel.

Scan operations, Scan( ), may be continued until all data items 163 residing in the live data store 132 are exhausted. Thereafter, scan operations, Scan( ), are performed on the proxy data store 131. Then, a first page of search results is obtained, and a list of unseen data items 163 is determined. As may be appreciated, this handles the case where a data item 163 is added during a scan operation. After scans are performed on the live data store 132, a dummy stub token is returned and, in subsequent scan calls, the proxy data store 131 is used.

Accordingly, at 403, the proxy data storage service 135 may determine whether a scan request includes a proxy data store page token. If so, the process may proceed to 406 where the proxy data storage service 135 switches to use of the proxy data store 131. Thereafter, a result is returned and the process proceeds to completion. Referring back to 403, if a proxy page token is not present, the process may proceed to 409. In 409, the proxy data storage service 135 may scan the live data store 132. Next, in 412, any items unseen on the client device 106 are obtained from the potential duplicates table. The unseen items and a result are determined. In 415, data items that are common between the result and the unseen items are determined.

Thereafter, in 418-427 items common between potential duplicates table are marked as seen, where the corresponding operations may be executed as multiple parallel calls. In 430, the proxy data storage service 135 may determine whether a pagination token is included in the result. If so, in 433, a result is created with the pagination token, which is then returned. Alternatively, in 436, a result is created with a proxy pagination token to be used on the proxy data store 131 in subsequent scan requests. A result may be returned and the process may proceed to completion.

Figure 5:
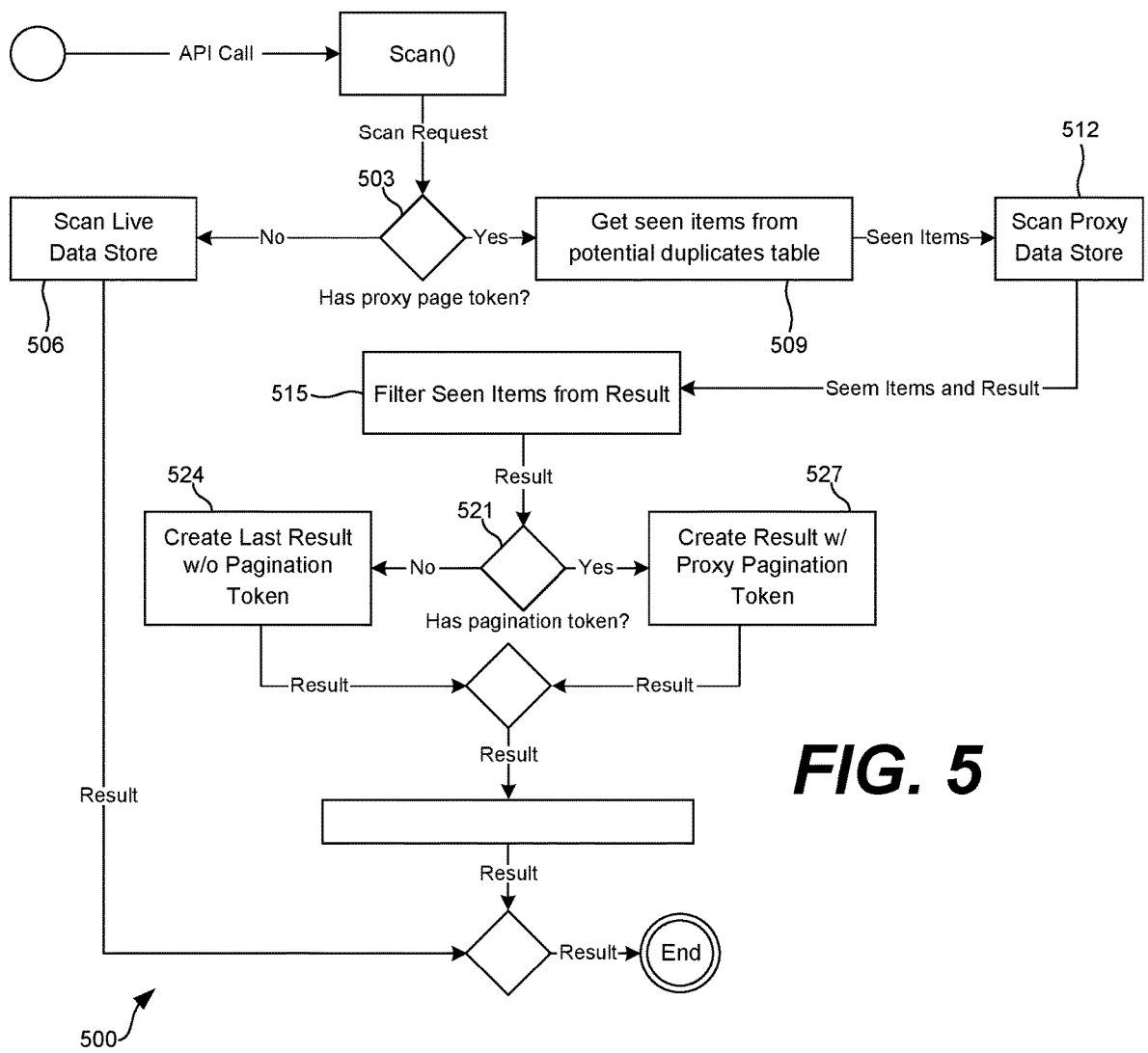
FIG. 5 is a flowchart illustrating yet another example of a scan operation executed in a computing environment in the networked environment of FIG. 1 according to various embodiments of the present disclosure.

Moving on to FIG. 5, a flowchart 500 is shown illustrating another example of a modified scan routine, Scan( ), according to various embodiments. While scanning items from the proxy data store 131, the following operations may be performed. First, seen data items 163 may be obtained from Table STR (Table SSTRI). Next, a page from the proxy data store 131 may be scanned (SDI). Data items 163 that are common between Table SSTRI and Page SDI are identified. Remaining items are returned as a result. In contrast to scan operations performed on the live data store 132, seen data items 163 are first scanned and the actual table is thereafter determined. This handles instances where a data item 163 is moved during a scan operation.

In some embodiments, conditional API calls may be employed, which are extensions of regular API calls with an added condition on primary keys, filters, etc. In the event a conditional call is executed, first, a location of a data item 163 must be determined. Additionally, any changes to a data item 163 should not occur during the execution. As such, in some embodiments, a lock may be implemented to lock the data item 163.

Once a live data store 132 has become available, and tables have been created for customers, table APIs may be executed on the live data store 132. This ensures that customer tables obtains updates, and table properties do not have to be synced again between the proxy data store 131 and the live data store 132.

Accordingly, beginning with 503, upon receipt of a scan request, the proxy data storage service 135 may determine whether a scan request includes a proxy page token. If not, the process may proceed to 503 where the live data store 132 is canned. Thereafter, a result is returned and the process proceeds to completion. Referring back to 503, if a proxy page token is present, the process may proceed to 509. In 509, the proxy data storage service 135 may obtain seen items, such as those that have been seen on the client device 106 from the potential duplicate data store. The seen items are pass to 512 where the proxy data store 131 is scanned using the seen items.

Next, in 515, the proxy data storage service 135 may filter seen items from the result. Thereafter, in 521, the proxy data storage service 135 may determine whether a pagination token is included in the result. If so, in 527, a result is created with a proxy pagination token, which is then returned. Alternatively, in 524, a result is created with a last result without a pagination token. A result may be returned and the process may proceed to completion.

Figure 6:
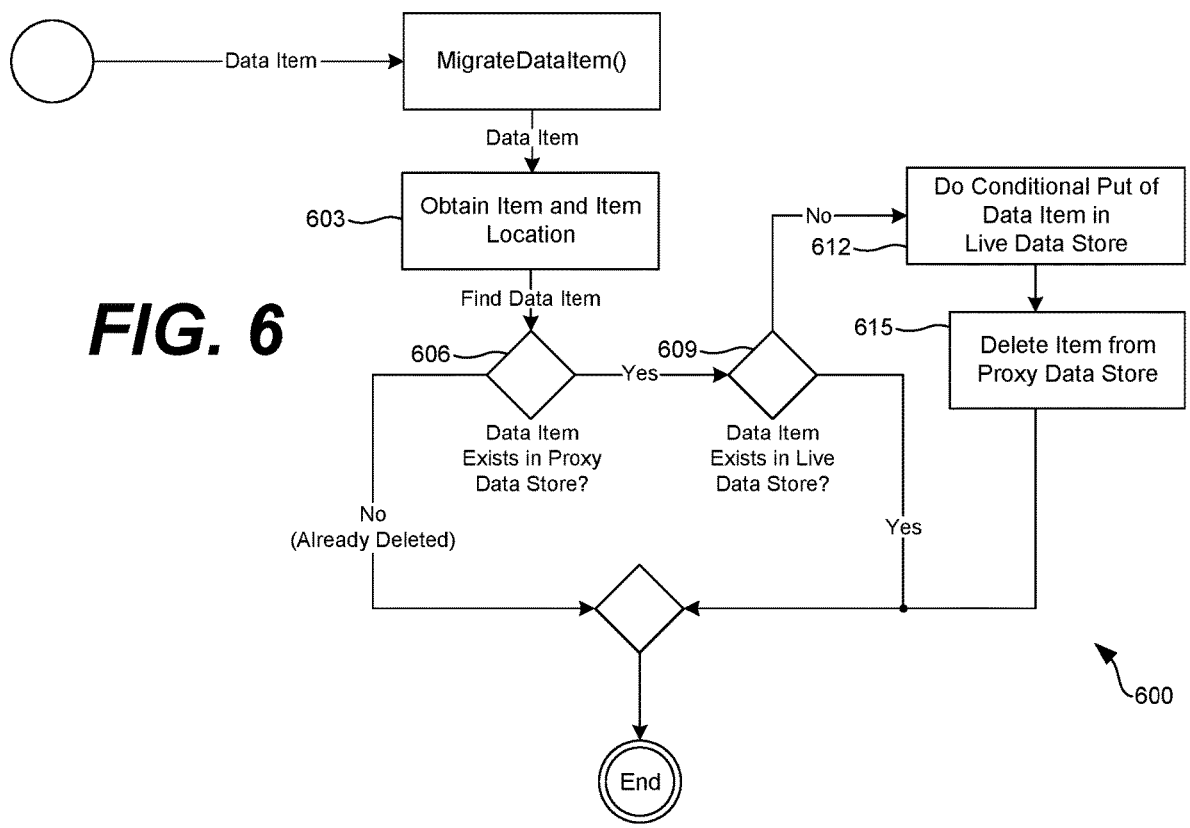
FIG. 6 is a flowchart illustrating one example of a migrate data operation executed in a computing environment in the networked environment of FIG. 1 according to various embodiments of the present disclosure.

Turning now to FIG. 6, a flowchart 600 is shown illustrating an example of a migrate routine, MigrateDataItem( ), according to various embodiments. With vector-based data stores, for example, more time for migration is available and migration teams do not have to operate under a strict time limit. However, it is understood that it is desirable to migrate data quickly between the proxy data store 131 and the live data store 132 such that only the live data store 132 is utilized.

As such, during migrations, in a first phase of migration, an inventory of the proxy data store 131 may be generated and, in a second phase of migration, data items 163 are copied into the live data store 132. In the second phase of migration, traditionally, operations are performed directly on the live data store 132 using customers assume role credentials. Further, it is assumed that the migration service has authority of data and, as such, unconditional Put( ) operations may be performed on the live data store 132 to copy data items 163.

With respect to FIG. 6, the data migration service 150 may iterate through the proxy data store 131 and store corresponding data items 163 in the live data store 132. As may be appreciated, certain problems may occur while performing migrations of live data. As such, after a live data store 132 is made available for use, an inventory of items stored in the proxy data store 131 is determined. The inventory will contain all data items 163 that need to be migrated.

Beginning with 603, after MigrateDataItem( ) has been invoked, the computing environment 103 may obtain a data item 163 and a location of the data item 163. In some examples, this is performed upon receipt of a API call 160 to read data from a data store 130. To do so, in 606, the proxy data storage service 135 may determine whether the data item 163 exists in a first data store 130, such as the proxy data store 131, by executing a first query of the data on the first data store 130. If the proxy data storage service 135 determines that the data item 163 does not reside in the proxy data store 131, it is understood that the date item 163 has already been deleted and the process may proceed to completion.

Alternatively, if the data item 163 existing in the proxy data store 131, the process may proceed to 609. In 609, the proxy data storage service 135 may determine whether the data item 163 also exists in a second data store 130, such as the live data store 132, by executing a second query on the second data store 130. If not, the process may proceed to 612 when a conditional Put( ) routine is invoked to place the data item 163 in the live data store 132. In response to the data existing in both the first data store 130 and the second data store 130, in 615, the data may be deleted from the first data store 130 such that an eventual migration of data from the first data store 130 to the second data store 130 is performed. A result of the first query and the second query may be generated and returned as a single result to a requesting service. Alternatively, if the data item 163 exists in the live data store 132, a migration is not needed and the process can proceed to completion.

In some embodiments, deleting data from one of the data stores 130 may include a "soft" deletion where a data item is not deleted from the data store 130. However, a flag or variable associated with the data item is set to "deleted" or similar parameter such that the data item is no longer used or retrieved in queries to the respective data store 130.

Figure 7:
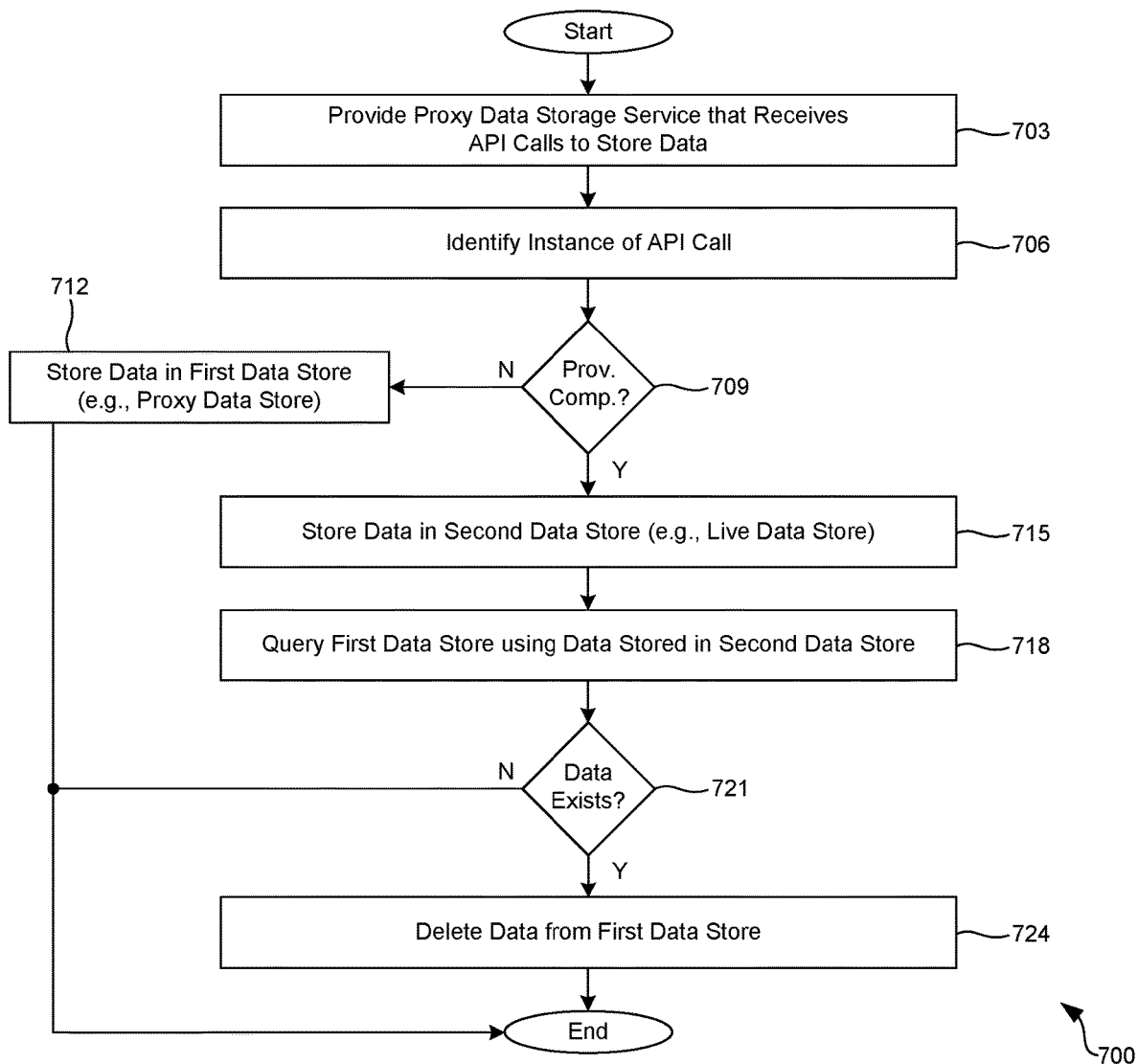
FIG. 7 is a flowchart illustrating one example of a data storage operation executed in a computing environment in the networked environment of FIG. 1 according to various embodiments of the present disclosure.

Referring next to FIG. 7, a flowchart 700 is shown that provides one example of the operation of a portion of the proxy data storage service 135 according to various embodiments. It is understood that the flowchart of FIG. 7 provides merely an example of the many different types of functional arrangements that may be employed to implement the operation of the portion of the proxy data storage service 135 as described herein. As an alternative, the flowchart of FIG. 7 may be viewed as depicting an example of elements of a method implemented in the computing environment 103 according to one or more embodiments.

Beginning with 703, the computing environment 103 may provide a proxy data storage service 135 that receives instances of an API call 160 to store data. Further, upon receipt of the API call 160, the proxy data storage service 135 may determine one of a first data store 130 (e.g., the proxy data store 131) or a second data store 130 (e.g., the live data store 132) to store the data. The data may include a data item 163 as may be appreciated.

In some embodiments, the proxy data storage service 135 may automatically determine whether to store data in the proxy data store 131 or the live data store 132 based on a state of migration of use. By way of example, assume a developer writes code that includes an API call 160 of "putItem(data_object_1)," which is invoked to store a data item 163, "data_object_1," in the data store 130. The proxy data storage service 135 may determine whether to store the data item 163 in the proxy data store 131 or the live data store 132 based on a state of migration of the proxy data store 131 to the live data store 132, as will be described.

As such, when the live data store 132 is being provisioned, the proxy data storage service 135 may store data items 163 in the proxy data store 131 in response to the "putItem( )" API call 160. However, when the live data store 132 is fully provisioned, the proxy data storage service 135 may store data objects in the live data store 132 in response to the "putItem( )" API call 160, which is the same as the previous API call 160. As such, developers are not required to rewrite code to account for the migration of the proxy data store 131 to the live data store 132.

Accordingly, in 706, the computing environment 103 may identify an instance of the API call 160, such as the "putItem( )" API call 160 described above. The instance of the API call 160 may be receipt of the API call 160 over a network, for example, which may be invoked by program code of a client application 178 or a network service 109.

Next, in 709, the computing environment 103 may determine whether a provisioning of the second data store 130 (e.g., the live data store 132) has been completed or has proceeded sufficiently such that data may be stored in the live data store 132. In some embodiments, the computing environment 103 may consult migration state data 133, which includes information associated with a state of provisioning of the live data store 132 or other data store 130. In some embodiments, the migration state data 133 include a configurable flag that identifies whether the live data store 132 is active or not.

If the provisioning of the second data store 130 has not been completed, the process may proceed to 712. In 712, the computing environment 103 may store data in the first data store 130, such as the proxy data store 131. In some embodiments, the first data store 130 may be located in a first regional computing stack 115*a* while the second data store 130 is located in a second (and different) regional computing stack 115*b*. Further, the computing environment 103 may store the data in the first data store 130 in association with a first user account, such as a development team user account. Thereafter, the process may proceed to completion. It is understood that future API calls 160 will similar cause the computing environment 103 to store data in the first data store 130 until the second data store 130 has been provisioned.

Referring again to 709, if the provisioning of the second data store 130 has been completed, the process may proceed to 715. In 715, after a provisioning of the second data store 130, the computing environment 103 may store data in the second data store 130. For instance, data may be stored in the second data store 130 in response to receipt of a second instance of the API call 160. In some embodiments, the computing environment 103 may store the data in the second data store 130 in association with a second user account, such as a customer account.

In some embodiments, the first data store 130 (e.g., the proxy data store 131) and the second data store 130 (e.g., the live data store 132) are different types of data stores (e.g., SQL versus non-SQL). As such, the data may be stored in the second data store 130 in response to an instance of the API call 160 after translating the API call 160 from a first format to a second format.

In 718, the computing environment 103 may query the first data store 130 using the data stored in the second data store 130, for instance, to determine whether the data stored in the second data store 130 also exists in the first data store 130. As such, in 721, the computing environment 103 may determine whether the data stored in the second data store 130 also exists in the first data store 130. If the data does not exist in the first data store 130, the data process may proceed to completion.

Alternatively, if the data does exist in the first data store 130, the process may proceed to 724. In 724, the computing environment 103 may delete the data from the first data store 130. Thereafter, the process may proceed to completion.

Figure 8:
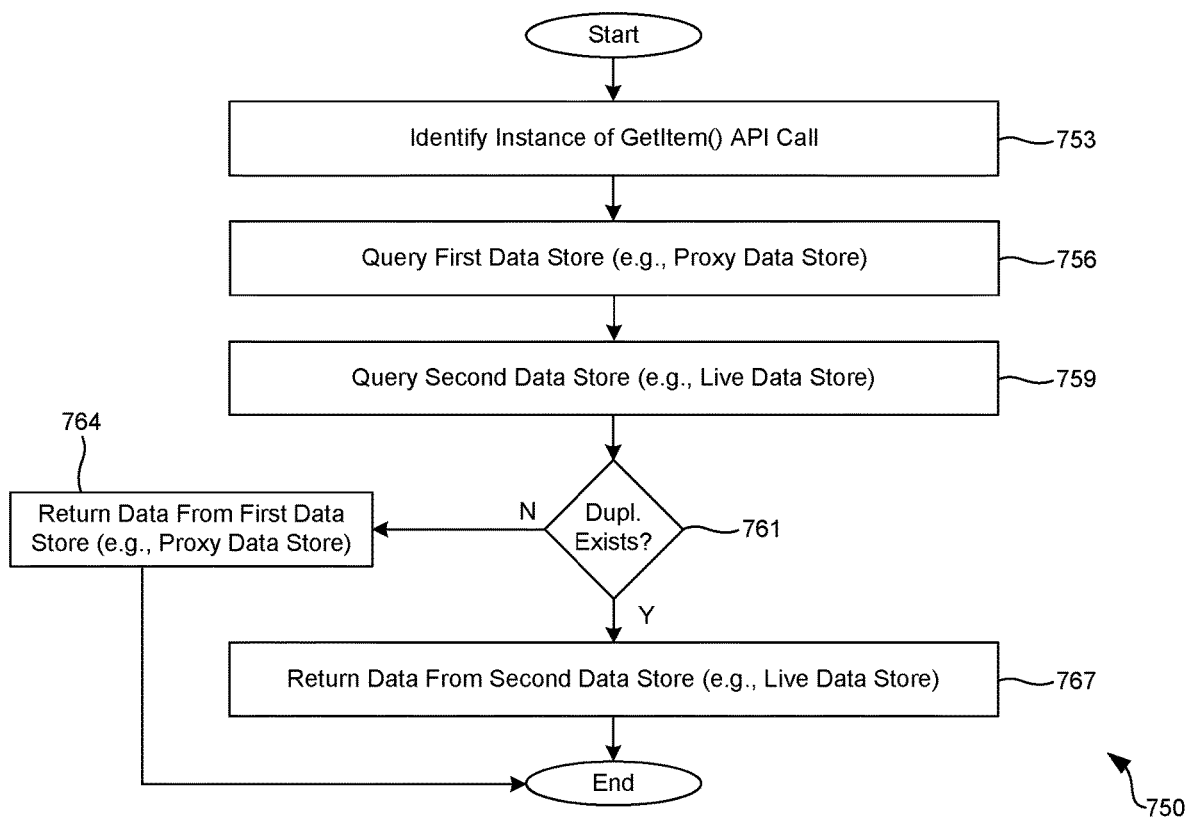
FIG. 8 is a flowchart illustrating one example of a data retrieval operation executed in a computing environment in the networked environment of FIG. 1 according to various embodiments of the present disclosure.

Turning now to FIG. 8, a flowchart 750 is shown that provides one example of the operation of a portion of the proxy data storage service 135 according to various embodiments. It is understood that the flowchart of FIG. 8 provides merely an example of the many different types of functional arrangements that may be employed to implement the operation of the portion of the proxy data storage service 135 as described herein. As an alternative, the flowchart of FIG. 8 may be viewed as depicting an example of elements of a method implemented in the computing environment 103 according to one or more embodiments.

Specifically, FIG. 8 illustrates an example of a data retrieval operation, such as a Get( ) or GetItem( ) routine, executed in the computing environment 103 according to various embodiments of the present disclosure. First, in 753, the proxy data storage service 135 may identify an instance of an API call 160, such as the Get( ) or GetItem( ) API call 160.

Thereafter, in 756, the proxy data storage service 135 may query a first data store 130, such as the proxy data store 131, using a data item identified in the Get( ) API call 160. It is understood that a response from the query will identify whether the data item was stored in the first data store 130. Otherwise, an error will be returned. Similarly, in 759, the proxy data storage service 135 may query a second data store 130, such as the live data store 133, using the data item identified in the Get( ) API call 160. Again, it is understood that a response from the query will identify whether the data item was stored in the second data store 130. Otherwise, an error will be returned. In some embodiments, 756 and 759 are performed concurrently or in parallel.

In 761, the proxy data storage service 135 may determine whether a duplicate exists between the first data store 130 (e.g., the proxy data store 131) and the second data store 130 (e.g., the live data store 132). If a duplicate does not exist, the process may proceed to 764. In 764, the proxy data storage service 135 may return the data item, and data associated therewith, as retrieved from the first data store 130. Thereafter, the process may proceed to completion.

Alternatively, if a duplicate exists or, in other words, a data item resides in both the first data store 130 and the second data store 130, the process may proceed to 767. In 767, the proxy data storage service 135 may return data from the second data store 130, ignoring the data stored in the first data store 130. Thereafter, the process may proceed to completion. An example overview of the Get( ) routine is summarized below:

| API | Call Sequence | Proxy Data Store Response | Live Data Store Response | Aggregated Result |
|---|---|---|---|---|
| GetItem( ) | In Parallel - GetItem | Success/Failure/ 404 | Success/ Failure | Live Data Store Response |
| GetItem( ) | In Parallel - GetItem | Success/Failure/ 404 | 404 | Proxy Data Store Response |
| GetItem( ) (with delete) | In Parallel - GetItem Proxy Data Store DeleteItem( ) | Success | Success | Live Data Store Response |

To perform an update operation, UpdateItem( ), a location of a data item in a data store 130 must be determined. To determine the location, a GetItem( ) API call 160 may be invoked to both data stores 130. The results from both data stores 130 may be aggregated and, in some embodiments, a result from the live data store 132 may take precedence over a result from the proxy data store 131. An example overview of the UpdateItem( ) routine is summarized below:

| API | Call Sequence | Item Location | Proxy Data Store Response | Live Data Store Response | Aggregated Result |
|---|---|---|---|---|---|
| UpdateItem( ) | In Parallel - GetItem( ) Item Data Store - UpdateItem( ) | Proxy Data Store | Success/ Failure | Not executed | Proxy Data Store Response |
| UpdateItem( ) | In Parallel - GetItem( ) Item Data Store - UpdateItem( ) | Live Data Store | Not executed | Success/ Failure | Live Data Store Response |
| UpdateItem( ) | In Parallel - GetItem( ) Item Data Store - UpdateItem( ) | 404 | Not executed | Success/ Failure | Proxy Data Store Response |

Figure 9:
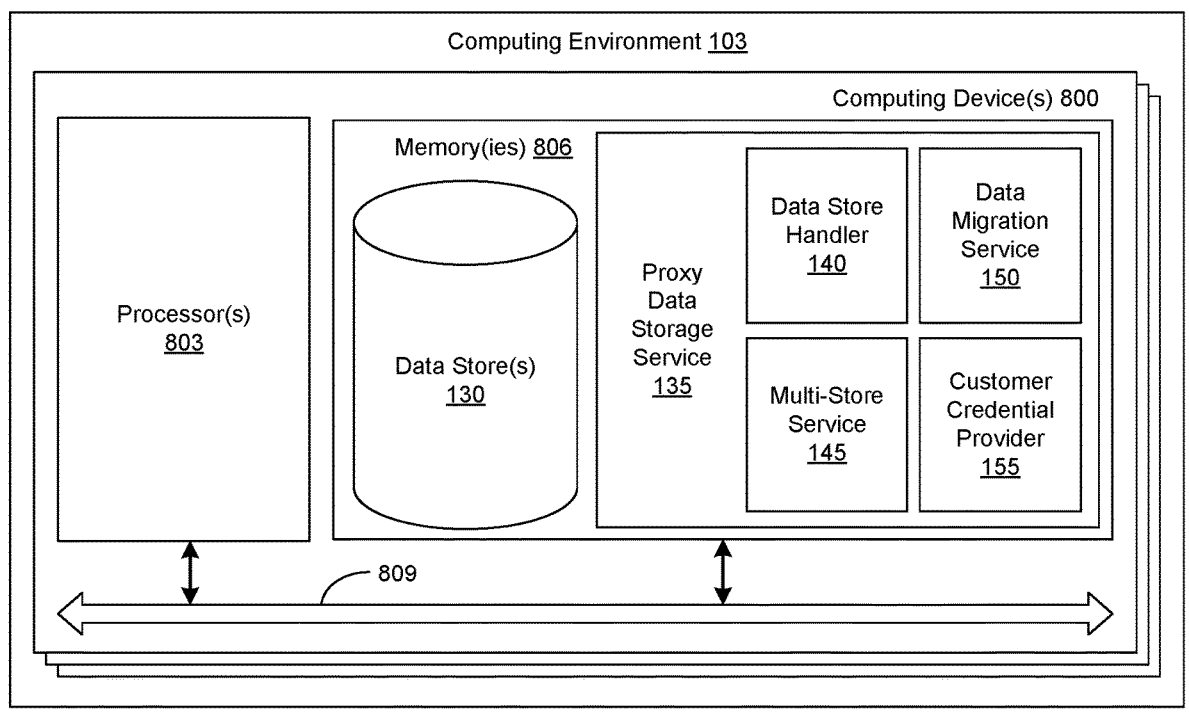
FIG. 9 is a schematic block diagram that provides one example illustration of a computing environment employed in the networked environment of FIG. 1 according to various embodiments of the present disclosure.

With reference to FIG. 9, shown is a schematic block diagram of the computing environment 103 according to an embodiment of the present disclosure. The computing environment 103 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the proxy data storage service 135, the data store handler 140, the multi-store service 145, the data migration service 150, the customer credential provider 155, and potentially other applications. Also stored in the memory 806 may be a data store 130 and other data. In addition, an operating system 175, as shown in FIG. 1, may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the proxy data storage service 135, the data store handler 140, the multi-store service 145, the data migration service 150, the customer credential provider 155, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-8 show the functionality and operation of an implementation of portions of the computing environment. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 3-8 show a specific order of execution, it is understood that the order of execution may differ from that which is depicted. For example, the order of execution of two or more blocks may be scrambled relative to the order shown. Also, two or more blocks shown in succession in FIGS. 3-8 may be executed concurrently or with partial concurrence. Further, in some embodiments, one or more of the blocks shown in FIGS. 3-8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the proxy data storage service 135, the data store handler 140, the multi-store service 145, the data migration service 150, and the customer credential provider 155, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the proxy data storage service 135, the data store handler 140, the multi-store service 145, the data migration service 150, and the customer credential provider 155, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device;
   executable program instructions stored in memory of the at least one computing device that, when executed, direct the at least one computing device to:
   provide a proxy data storage service that receives instances of an application programming interface (API) call to store data and determines one of a first data store or a second data store to store the data based at least in part on a state of migration of use from the first data store to the second data store;
   in response to receipt of a first instance of the API call, store data in the first data store;
   after a provisioning of the second data store, receive a second instance of the API call to store a data item;
   record the data item in a potential duplicate data store;
   store the data item in the second data store;
   determine that the data item stored in the second data store exists in the first data store;
   in response to the data item stored in the second data store existing in the first data store, delete the data item from the first data store; and
   delete the data item from the potential duplicate data store.

2. The system of claim 1, wherein the at least one computing device is further configured to spawn a virtual process that migrates individual data items existing in the first data store to the second data store.

3. The system of claim 2, wherein the virtual process that migrates individual data items existing in the first data store to the second data store is configured to:
   generate an inventory of data items to migrate from the first data store to the second data store;
   for a data item in the inventory of data items, determine a location of the data item;
   determine that the data item exists in the first data store;
   in response to the data item existing in the first data store, determine that the data item does not exist in the second data store; and
   in response to the data item not existing in the second data store, store the data item in the second data store.

4. A system, comprising:
   at least one computing device;
   executable program instructions stored in memory of the at least one computing device that, when executed, direct the at least one computing device to:
      provide a proxy data storage service that receives instances of an application programming interface (API) call to store data;
      in response to receipt of a first instance of the API call, store data in a first data store;
      after a provisioning of a second data store, store data in the second data store in response to receipt of a second instance of the API call;
      determine that the data stored in the second data store exists in the first data store; and
      in response to the data stored in the second data store existing in the first data store, delete the data from the first data store.

5. The system of claim 4, wherein:
   the first data store is located in a first regional computing stack; and
   the second data store is located in a second regional computing stack, the second regional computing stack at a location different than the first regional computing stack.

6. The system of claim 4, wherein:
   the data stored in the first data store is stored in association with a development team user account; and
   the data stored in the second data store is stored in association with a customer account.

7. The system of claim 4, wherein:
   the first data store and the second data store are different types of data stores that require the API call to be in different formats; and
   the data is stored in the second data store in response to the second instance of the API call after translating the API call from a first format to a second format.

8. The system of claim 4, wherein the at least one computing device is further directed to, in response to receipt of a read API call that reads data from the first data store or the second data store:
   determine that the data exists in both the first data store and the second data store;
   in response to the data existing in both the first data store and the second data store, delete the data from the first data store; and
   return the data from the second data store.

9. The system of claim 4, wherein, in response to receipt of the second instance of the API call, the at least one computing device is further directed to:
   identify a data item from the second instance of the API call;
   record the data item in a potential duplicate data store;
   store the data item in the second data store;
   in response to the data item residing in the first data store, delete the data item from the first data store; and
   delete the data item from the potential duplicate data store.

10. The system of claim 9, wherein the at least one computing device is further directed to asynchronously delete the data item from the potential duplicate data store and delete the data item from the first data store.

11. The system of claim 4, wherein the at least one computing device is further configured to spawn a virtual process that migrates individual data items existing in the first data store to the second data store.

12. The system of claim 11, wherein the virtual process that migrates individual data items existing in the first data store to the second data store is configured to:
   generate an inventory of data items to migrate from the first data store to the second data store;
   for a data item in the inventory of data items, determine a location of the data item;
   determine that the data item exists in the first data store;
   in response to the data item existing in the first data store, determine that the data item does not exist in the second data store; and
   in response to the data item not existing in the second data store, store the data item in the second data store.

13. A computer-implemented method, comprising:
   receiving, by at least one computing device comprising at least one hardware processor, an application programming interface (API) call to read data from a data store;
   in response to receipt of the API call, executing, by the at least one computing device, a first query on a first data store to determine that the data exists in the first data store;
   executing, by the at least one computing device, a second query on a second data store to determine that the data exists in the second data store;
   in response to the data existing in both the first data store and the second data store, deleting, by the at least one computing device, the data from the first data store to perform a migration of data from the first data store to the second data store; and
   aggregating, by the at least one computing device, a result of the first query and the second query and returning a single result to a requesting service.

14. The computer-implemented method of claim 13, further comprising spawning, by the at least one computing device, a virtual process that migrates individual data items existing in the first data store to the second data store.

15. The computer-implemented method of claim 14, wherein the virtual process migrates individual data items existing in the first data store to the second data store by:
   generating, by the at least one computing device, an inventory of data items to migrate from the first data store to the second data store;
   for a data item in the inventory of data items, determining, by the at least one computing device, a location of the data item;
   determining, by the at least one computing device, that the data item exists in the first data store;
   in response to the data item existing in the first data store, determining, by the at least one computing device, that the data item does not exist in the second data store; and in response to the data item not existing in the second data store, storing, by the at least one computing device, the data item in the second data store.

16. The computer-implemented method of claim 13, wherein:
   the first data store is located in a first regional computing stack; and
   the second data store is located in a second regional computing stack, the second regional computing stack being different than the first regional computing stack.

17. The computer-implemented method of claim 16, wherein:
   data stored in the first data store is stored in association with a development team user account; and
   data stored in the second data store is stored in association with a customer account.

18. The computer-implemented method of claim 17, wherein the first data store and the second data store are different types of data stores that require the API call to be in different formats.

19. The computer-implemented method of claim 13, further comprising:
   providing, by the at least one computing device, a proxy data storage service that receives instances of a store API call to store data and determines one of the first data store or the second data store to store the data;
   in response to receipt of a first instance of the store API call, storing, by the at least one computing device, data in the first data store;
   after a provisioning of the second data store, storing, by the at least one computing device, data in the second data store in response to receipt of a second instance of the store API call;
   determining, by the at least one computing device, that the data stored in the second data store exists in the first data store; and
   in response to the data stored in the second data store existing in the first data store, deleting, by the at least one computing device, the data from the first data store.

20. The computer-implemented method of claim 19, wherein the data is stored in the second data store in response to receipt of the second instance of the store API call by:
   identifying, by the at least one computing device, a data item from the second instance of the store API call;
   recording, by the at least one computing device, the data item in a potential duplicate data store;
   storing, by the at least one computing device, the data item in the second data store;
   in response to the data item residing in the first data store, deleting, by the at least one computing device, the data item from the first data store; and
   deleting, by the at least one computing device, the data item from the potential duplicate data store.

* * * * *